United States Patent
Bonnet

(10) Patent No.: US 6,189,702 B1
(45) Date of Patent: Feb. 20, 2001

(54) OVERHEAD MOUNTED SORTER FOR CONVEYORS

(75) Inventor: Henri Bonnet, Atlanta, GA (US)

(73) Assignee: United Parcel Service of America, Inc., Atlanta, GA (US)

( * ) Notice: Under 35 U.S.C. 154(b), the term of this patent shall be extended for 0 days.

(21) Appl. No.: 09/200,487

(22) Filed: Nov. 25, 1998

(51) Int. Cl.$^7$ .................................................. B07C 9/00
(52) U.S. Cl. .................. 209/651; 209/653; 209/615; 198/370.02; 198/370.07; 198/748
(58) Field of Search .................... 209/503, 552, 209/559, 562, 563, 564, 615, 616, 651, 654, 656, 657, 658, 918; 198/370.07, 370.02, 748

(56) References Cited

U.S. PATENT DOCUMENTS

| | | | |
|---|---|---|---|
| 3,071,239 | 1/1963 | Burtness | 198/188 |
| 3,170,572 | 2/1965 | Harrison | 209/74 |
| 3,181,685 | 5/1965 | Brunner et al. | 198/24 |
| 3,246,733 | 4/1966 | Torbet et al. | 198/185 |
| 3,710,923 | 1/1973 | Fromme et al. | 198/81 |
| 3,759,381 | 9/1973 | Mercadie et al. | 209/73 |
| 3,835,979 | 9/1974 | Calvert et al. | 198/30 |
| 3,838,763 | 10/1974 | Rooke et al. | 198/20 |
| 3,955,678 | 5/1976 | Moyer | 209/74 |
| 4,147,248 | 4/1979 | Kurczak et al. | 198/358 |
| 4,239,434 | 12/1980 | Gannon | 414/136 |
| 4,253,573 | * 3/1981 | Dubberly et al. | 209/525 |
| 4,364,465 | 12/1982 | Kraft et al. | 198/452 |
| 4,723,647 | 2/1988 | Norton et al. | 198/364 |
| 4,732,260 | 3/1988 | Canziani | 198/365 |
| 5,054,601 | 10/1991 | Sjogren et al. | 198/365 |
| 5,275,272 | * 1/1994 | Ydoate | 198/367 |
| 5,433,311 | 7/1995 | Bonnet | 198/370.04 |
| 5,489,017 | * 2/1996 | Bonnet | 198/370.04 |
| 5,547,063 | 8/1996 | Bonnet | 198/370.02 |
| 5,620,102 | 4/1997 | Finch | 209/583 |
| 5,655,643 | 8/1997 | Bonnet | 198/370.08 |
| 5,794,790 | 8/1998 | Bonnet | 209/653 |
| 5,839,566 | 11/1998 | Bonnet | 198/370.04 |

FOREIGN PATENT DOCUMENTS

| | | |
|---|---|---|
| 002038620 * | 2/1972 | (DE). |
| 0 315 807 A1 | 5/1989 | (EP). |
| 39 16424 A1 | 5/1989 | (DE). |
| 0 619 252 A2 | 10/1994 | (EP). |
| WO 99/33721 | 7/1999 | (WO). |

* cited by examiner

Primary Examiner—Donald P. Walsh
Assistant Examiner—Johnathan R. Miller
(74) Attorney, Agent, or Firm—Alston & Bird LLP

(57) ABSTRACT

The present invention reveals a sorting device, positioned above and orientated across a plurality of conveyors, capable of diverting objects between the conveyors or removing objects entirely from the conveyors, based on the object's destination location or some other characteristic. To accomplish its purpose, the device comprises: a primary conveyor; a secondary conveyor; a monorail positioned above and orientated across the conveyors; a carriage that mounts the monorail; a linear actuator that drives the carriage side to side the length of the monorail; a paddle attached to the carriage that extends downward to contact the objects; a wiper located along the bottom edge of the paddle that is biased in contact with the conveyors; and a controller capable of positioning the carriage so the paddle contacts the object to be diverted and pushes it between conveyors or from conveyors to adjacent destination locations.

22 Claims, 7 Drawing Sheets

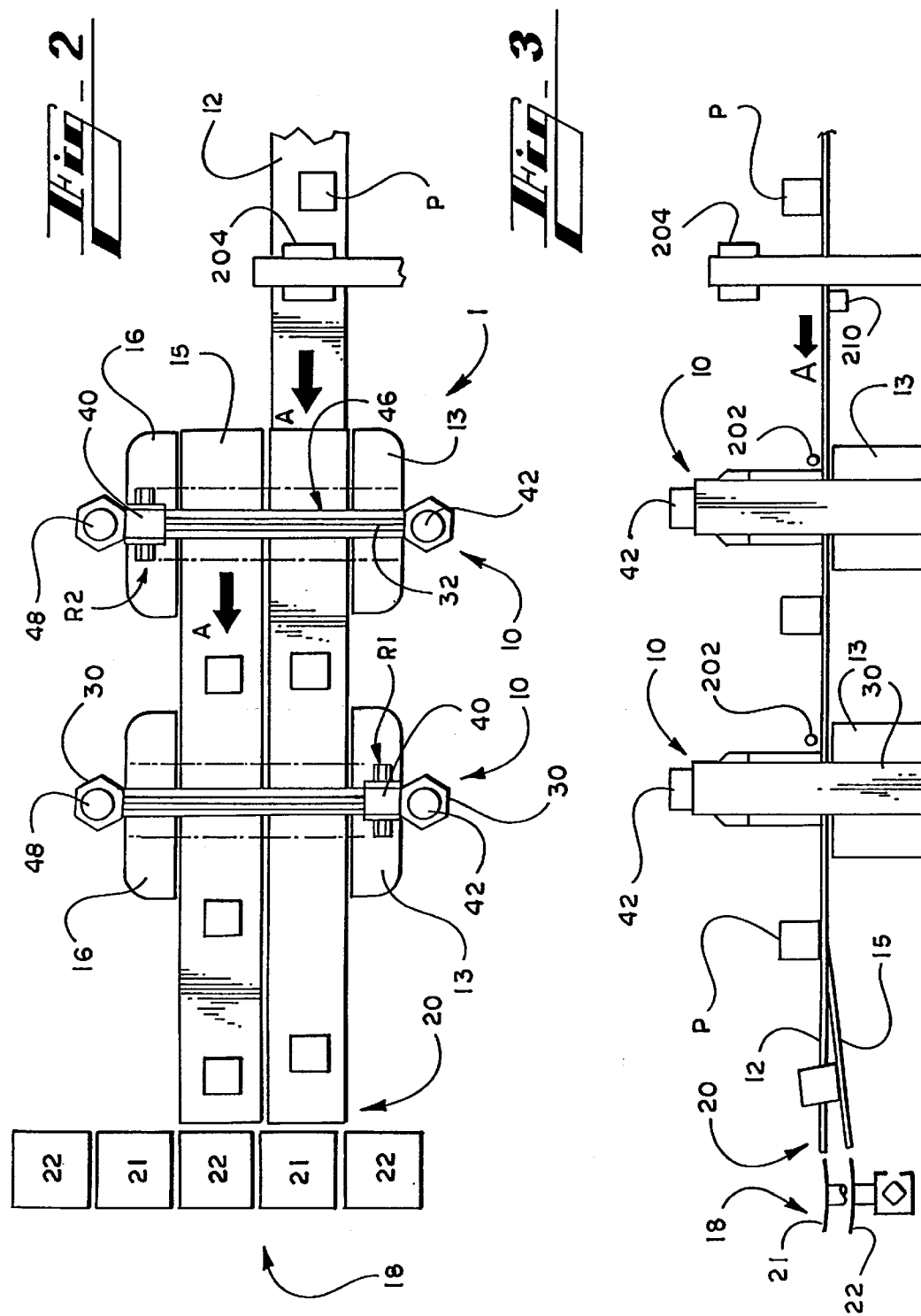

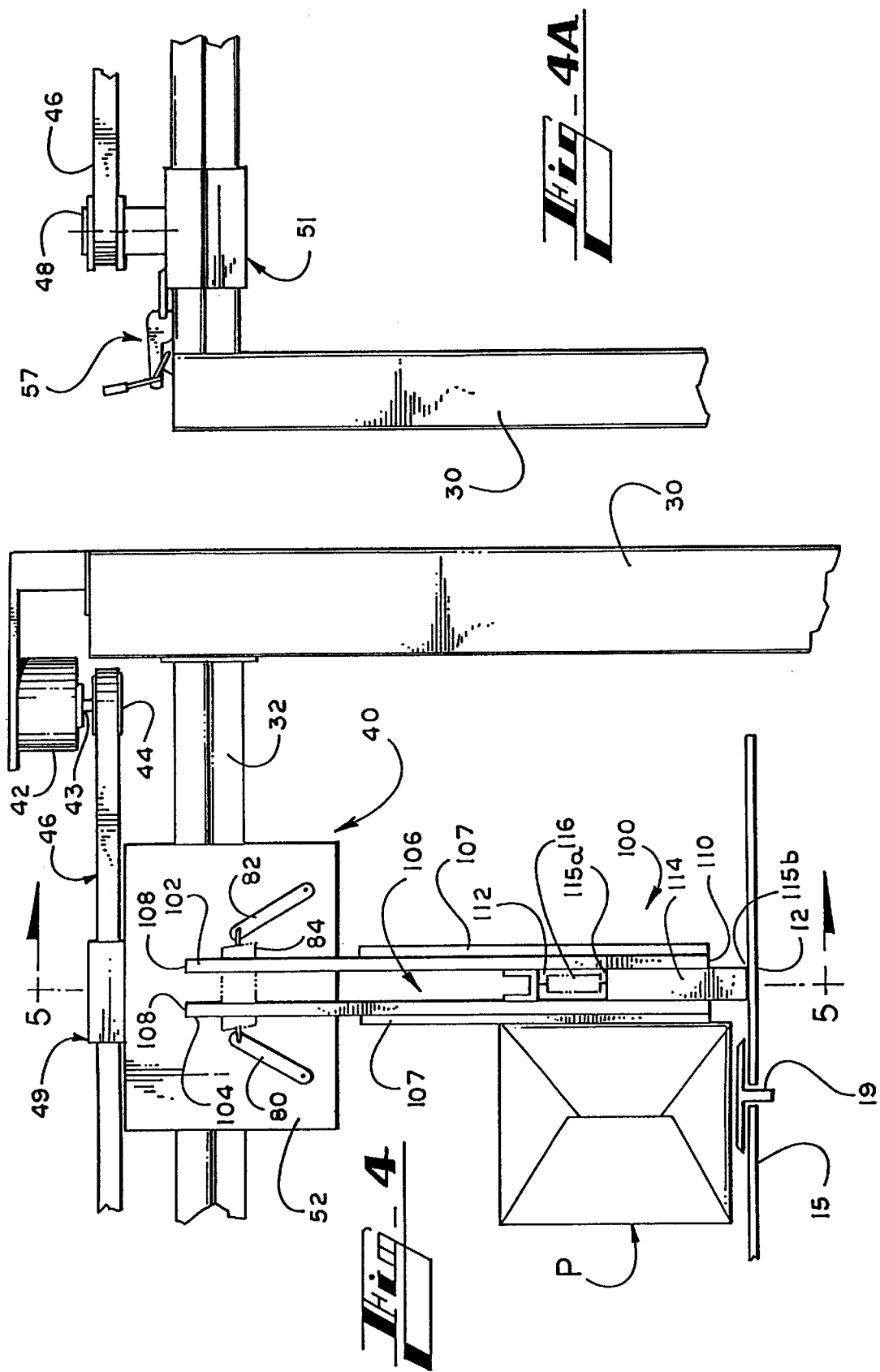

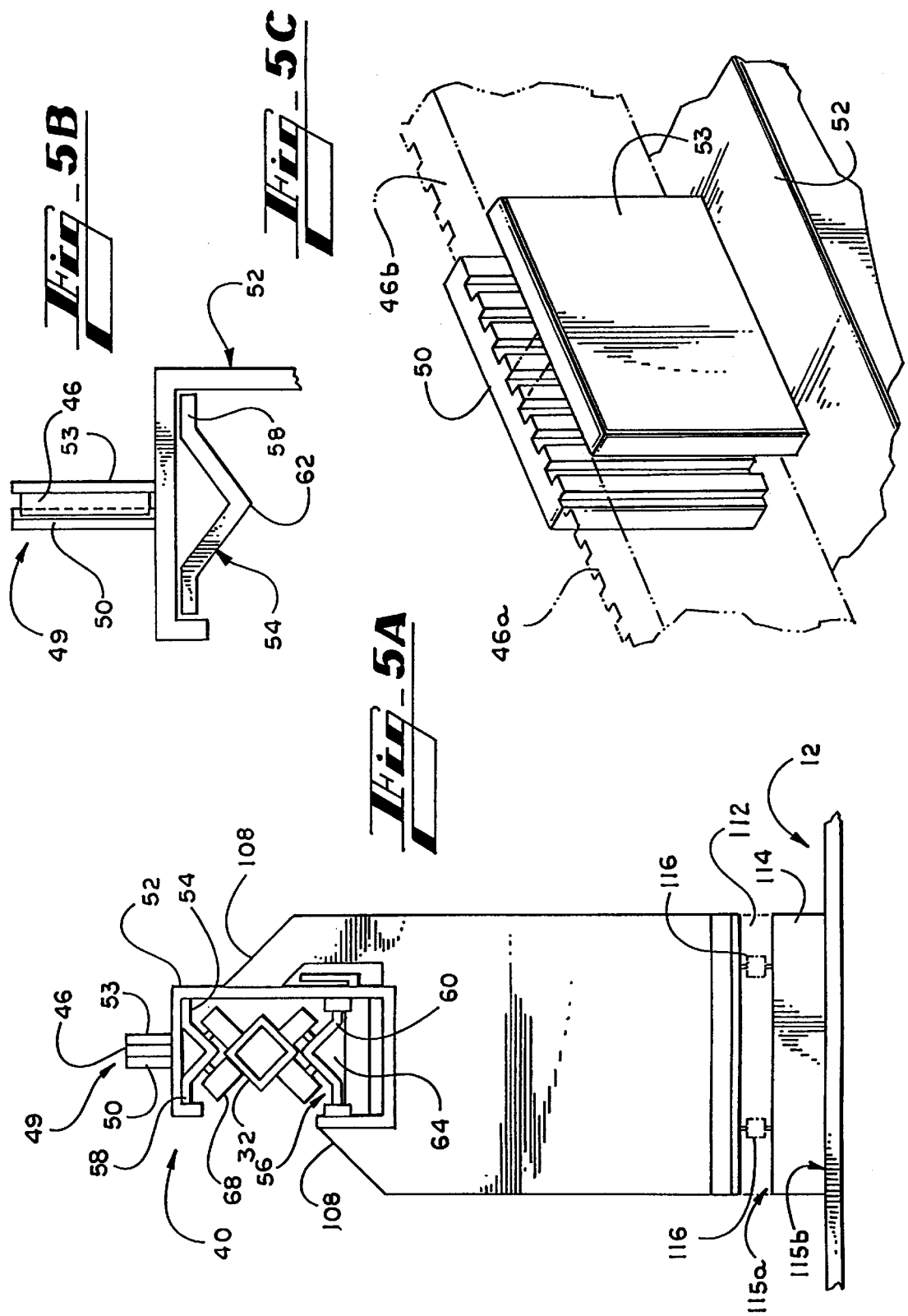

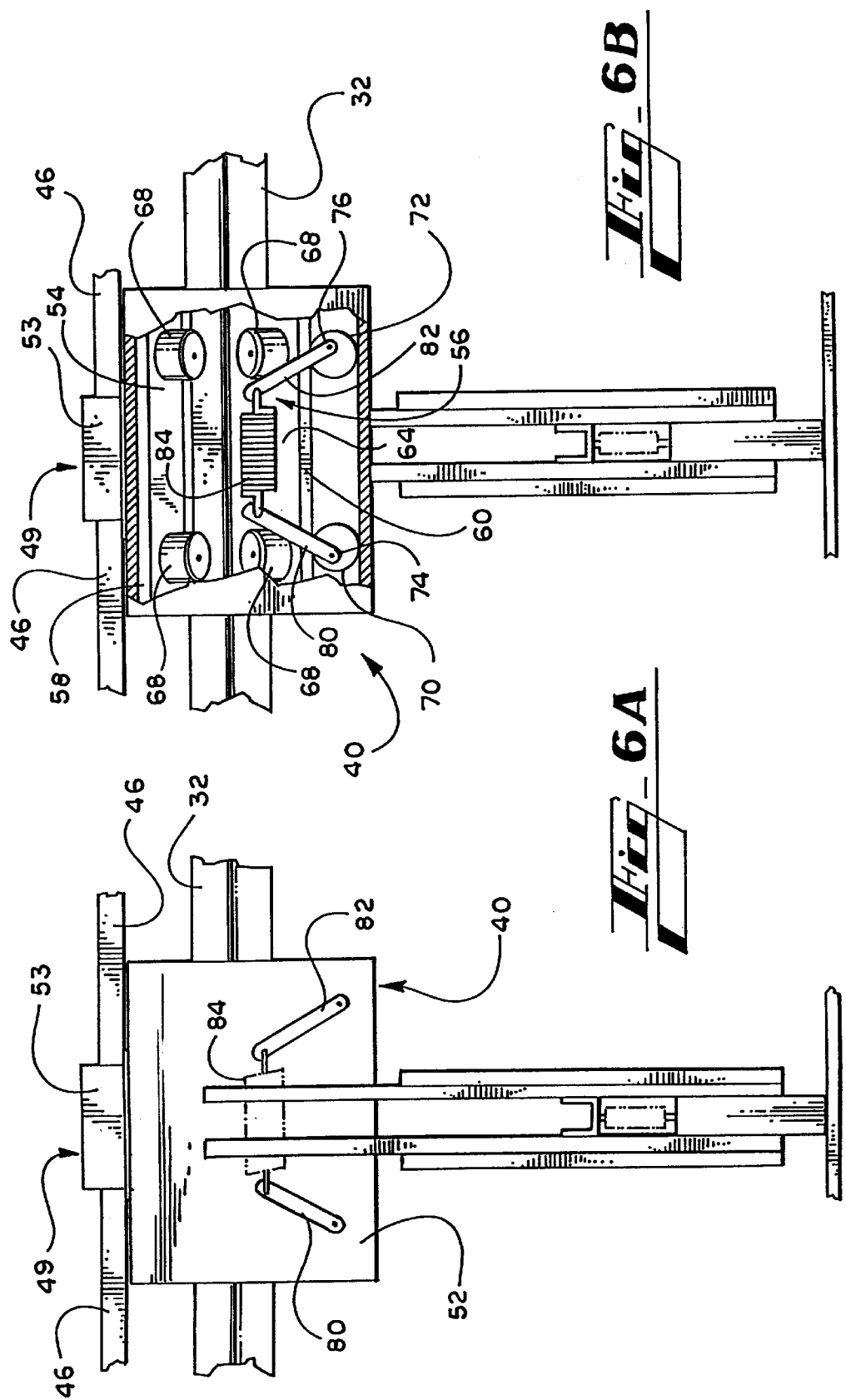

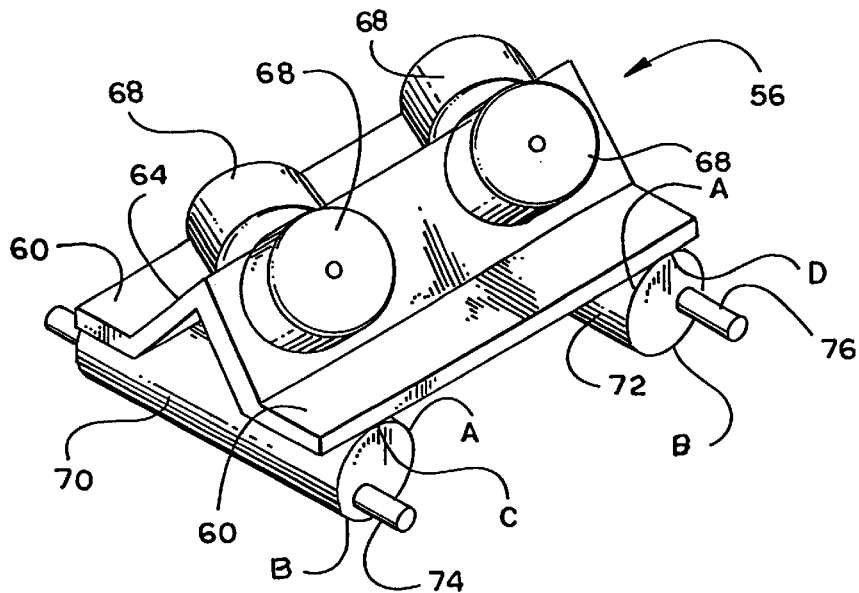
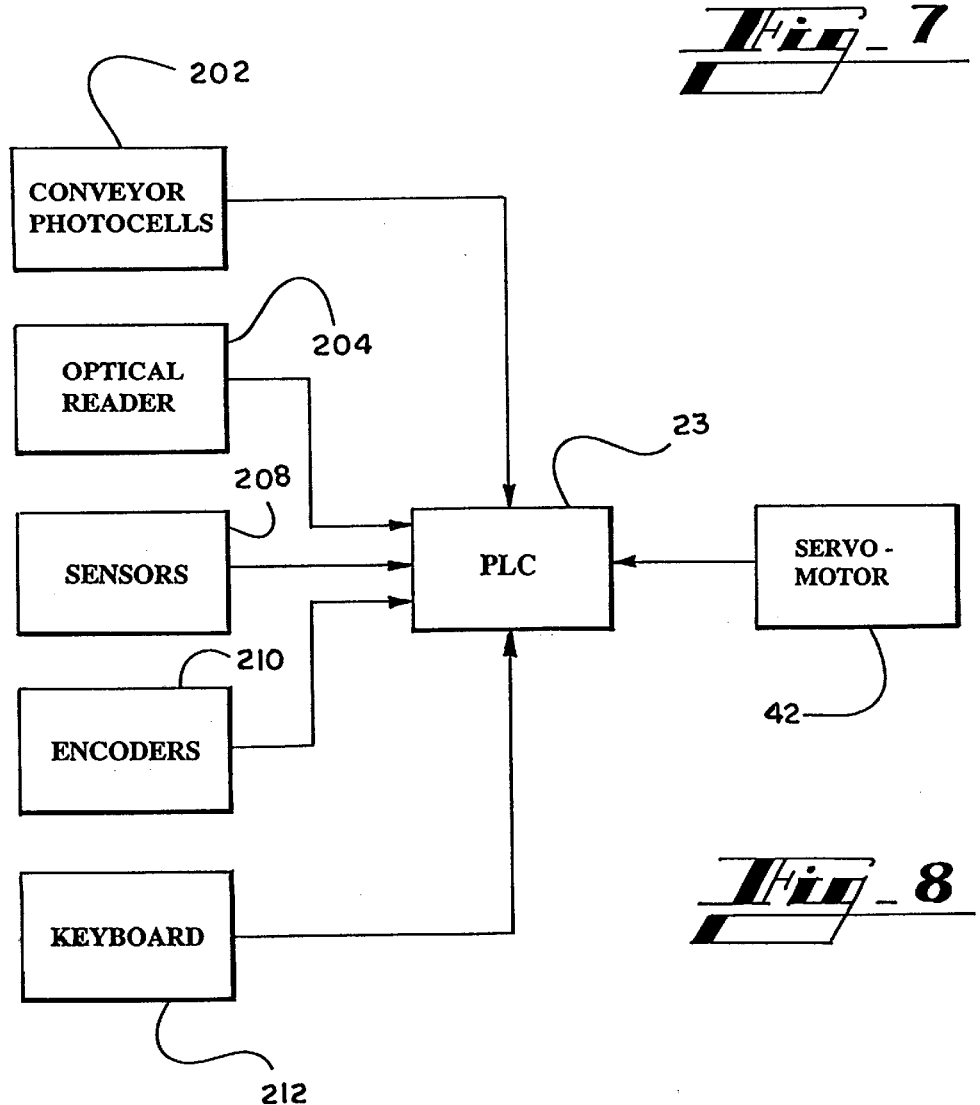

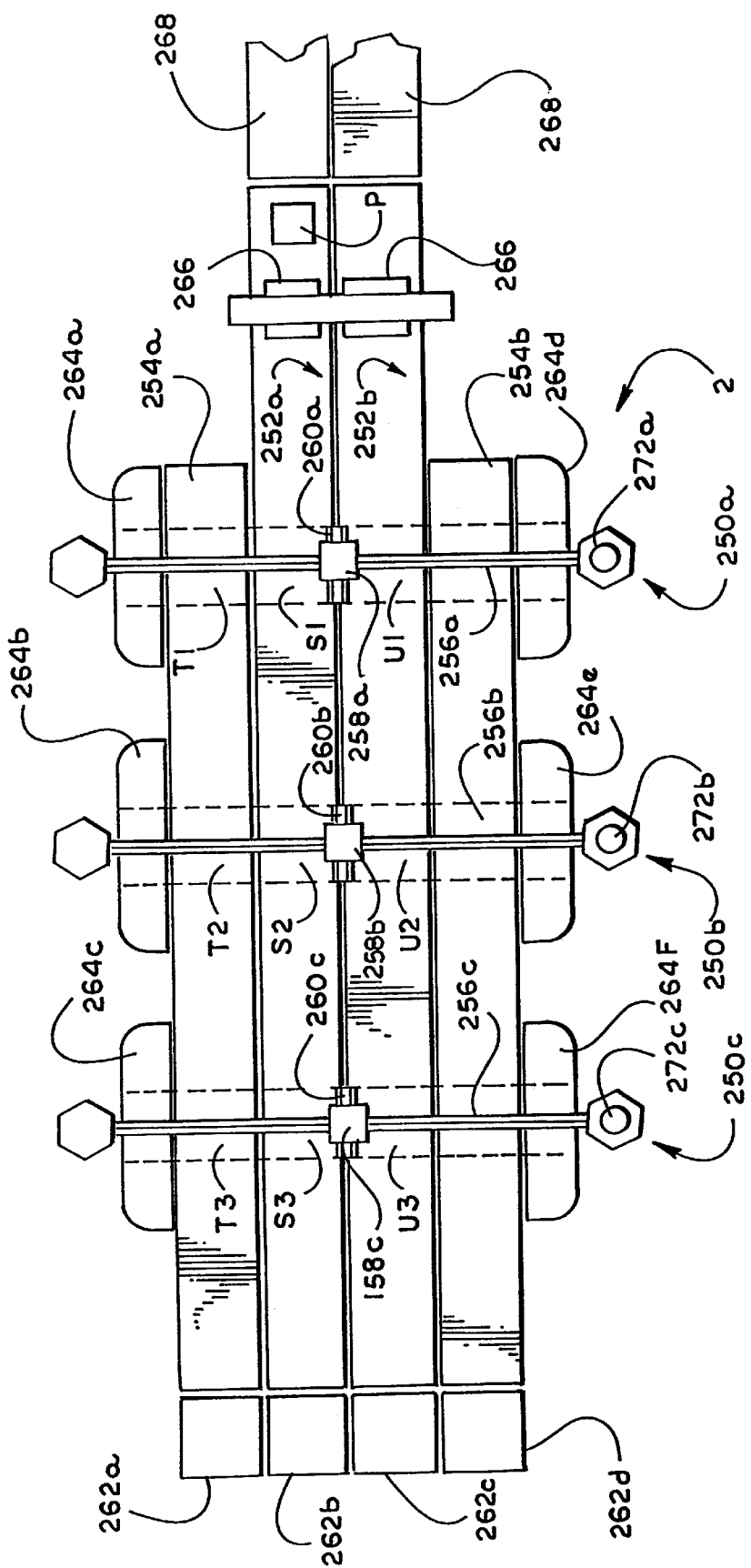

OVERHEAD MOUNTED SORTER FOR CONVEYORS

TECHNICAL FIELD

The present invention relates to the automated sorting of objects bound for different geographical locations, and more particularly relates to an overhead mounted sorting device which receives objects from a feed conveyor and diverts them among adjacent conveyors to feed a multi-level tilt tray sorter, all under programmed control.

BACKGROUND ART

Daily, package delivery companies collect millions of packages from thousands of locations scattered over large geographical areas and transport them to sorting facilities for processing. After processing, the packages are carried to an equally large number of destinations. To meet the rigorous schedule of today's business environment while providing accurate deliveries of packages, sorting facilities are equipped with automated transfer systems whenever possible. These transfer systems must be fast, durable, easy to repair or replace, and provide gentle but accurate handling of each package.

Initially, laborers employed at a sorting facility comprised the sorting process; that is, they had to grab, lift, carry and place packages from one sorting station to another. Such use of labor produced an exceedingly slow and inefficient system. Later systems provided conveyors that fed packages to a cluster of laborers who choose a package, picked it up, read the zip code or foreign address, then placed the package on a conveyor associated with the package's destination. That process was repeated in successively finer steps until the package was loaded onto a delivery vehicle assigned to a limited geographic area.

Presently, extensive use of manual labor has diminished as new sorting facilities are equipped with automated sorting and transfer systems that provide significantly improved package handling. For example, it is known to provide a powered feed conveyor to meter articles one-by-one onto a sorter, or to transport articles from one sorting station to another. In addition, it is known to mechanically divert articles from a feed conveyor to a multitude of output destinations. To accomplish that latter task, a device is typically positioned adjacent or under the feed conveyor and configured to knock, shove or drag the article from the conveyor. However, the reach of existing systems do not span to include multiple conveyors, often work only in conjunction with specific types of conveyors, include complex mechanisms that are relatively difficult to repair, and are unable to move as fast as many existing feed conveyors.

U.S. Pat. No. 3,071,239 (Burtness) discloses a mechanism suspended above a conveyor for knocking articles onto adjacent output destinations. Burtness includes a reversible drive motor centered over the conveyor and connected to a drive chain. Three paddles are attached to and spaced equidistant around a second chain. To remove an article from the conveyor, the second chain is driven clockwise or counterclockwise as required to knock the article to the right or left off the conveyor. Each time the second chain is rotated, the nearest paddle knocks the article off the conveyor and the remaining paddles are positioned in preparation for the following articles.

The transfer system disclosed in U.S. Pat. No. 3,246,733 (Torbet) describes an overhead bidirectional mechanism for laterally sweeping articles from a conveyor. The Torbet invention includes a housing with a retractable blade assembly including a motor and drive means. In operation, the blade rests inside the housing until directed to extend down toward the conveyor and begin a side to side sweeping movement, effectuated by swinging the blade about a horizontal axis. After sweeping the article off the conveyor, the blade retracts into the housing. When extended, the blade operates in an orbital path, downward from the housing and across the conveyor belt.

U.S. Pat. No. 3,170,572 (Harrison) describes transferring an article from one conveyor to another with a transferring station. More specifically, Harrison teaches transferring an article from one side of a specially constructed transfer platform to the other side, using cogs affixed to multiple chains mounted below the conveying surface. To transfer an article, the chains are rotated so the cogs extend upward and beyond the conveying surface to engage the article and drag it from one side of the transfer platform to the other. Once relocated, the powered rollers of the transfer platform carry the article forward to an attached conveyor section.

A programmable automated sorting system is disclosed in U.S. Pat. No. 5,620,102 (Finch). There, a roller feed conveyor transports articles toward a series of switching stations that can divert an article to the destination location adjacent the switching station. More specifically, Finch teaches laterally ejecting an article from a roller feed conveyor with a device mounted below the conveying surface.

The primary thrust of the prior art devices is to perform the single unilateral motion of removing an article from a conveyor. Such devices perform a limited function and lack versatility. For example, none can divert articles from a first conveyor across an adjacent second conveyor to an adjacent destination location. Likewise, none can direct articles in the opposite direction; that is, from a second conveyor onto a first conveyor. Finally, none can divert such physically distinct articles as large boxes and flat envelopes carried on a conventional belt conveyor.

Thus, there is a need in the art for a diverting system that spans multiple conveyor widths; operates entirely with a conventional belt conveyor; diverts articles either off of or onto a conveyor; is small, compact, uncomplicated and fast enough to keep up with modern conveyor speeds; and does not require the entire unit to be shut down for more than a few minutes in the event repairs are required.

SUMMARY OF THE INVENTION

The present invention seeks to provide a diverter for objects moving along a conveyor that efficiently moves objects of varying heights off the conveyor at a rapid rate. In accordance with the present invention, this objective is accomplished by providing a device for automatically sorting objects, comprising: a conveyor transporting objects; a rail orientated above and across the conveyor; a carriage mounted to translate along the rail; a paddle extending from the carriage down into the path of objects traveling on the conveyor; and, a controller capable of operating the carriage.

The present invention, in one or more of its embodiments, also seeks to cure the process problems and prior art inadequacies noted above by providing a rapid-action automatic sorting device capable of diverting articles from a primary conveyor to an adjacent secondary conveyor; from a primary conveyor across multiple adjacent secondary conveyors; from a secondary conveyor to an adjacent primary conveyor; or, from a primary conveyor to an adjacent secondary destination location opposite the adjacent secondary conveyor(s). The present invention seeks to perform the above sequences without slowing throughput speed and more effectively that other low profile systems. That is, a sorting system that includes a primary conveyor, a secondary conveyor and a single sorting device embodying the present invention can sort up to 5000 articles per hour, from large boxes to small flat envelopes.

In addition, the present invention seeks to provide a sorting and feeding device that diverts articles between conveyors configured for transporting objects to different elevations such as required for the multi-level tilt tray sorting device disclosed in U.S. Pat. No. 5,433,311, incorporated herein by reference. The present invention also seeks to provide a diverter that can be adapted to meter articles one-by-one into stations of an article transporting apparatus, such as the above-mentioned multi-level tilt tray sorting device.

In the preferred embodiment, a primary conveyor is configured so that its output end will deposit articles onto an upper level tray of a multi-level tilt tray sorting device, and a secondary conveyor is configured so that its output end will deposit articles onto a lower level tray of a multi-level tilt tray sorting device. Both conveyors include adjacent destination locations, such as reject receptacles, located at the opposite outside edges of each conveyor. The rail, positioned above and orientated across the conveyors and adjacent destination locations, is supported at opposite ends by upright columns. The carriage mounts the rail and is driven back and forth by a reversible servo-motor and drive belt configuration. The paddle, affixed to the carriage and extending downward to contact the conveyors, is driven when required to divert the objects on the conveyors. Horizontal translation of the carriage provides the range of motion to align the paddle with an object and divert it between or entirely off the conveyors.

In practice, the carriage is directed according to destination information affixed to the object and input to a programmed logic controller by an optical reader. A shaft encoder on the primary conveyor can track the object while photocells immediately before the sorting device signal the object is entering the path of the paddle. For example, an object on the upper conveyor whose final destination is associated with the upper level tray, will pass uninterrupted under the rail. However, an object on the primary conveyor whose final destination is not associated with the upper level tray will be diverted from that conveyor, by the paddle driven by the carriage, to the secondary conveyor or the adjacent destination location.

Alternative embodiments incorporating the present invention are readily apparent. For example, a sorting system may be constructed of a device embodying the present invention and a single primary feed conveyor that sorts among two secondary feed conveyors, which then carry the sorted objects to locations within the sorting facility associated with the objects' destination location. The above alternative embodiment may be compounded to create a sorting system constructed of many devices embodying the present invention and many primary feed conveyors that sort among a far greater number of secondary feed conveyors. Thus, the device embodying the present invention can be duplicated as many times as desired for sorting to more destination locations. In addition to the many possible combinations and configurations of primary and secondary conveyors, other alternative embodiments may include other methods of conveyance; any number of different linear actuator combinations; and any number or configuration of destination locations.

BRIEF DESCRIPTION OF THE DRAWINGS

FIG. 2 shows a top diagrammatic view of the sorting and feeding system embodying the present invention.

FIG. 3 shows a side diagrammatic view of the sorting and feeding system embodying the present invention.

FIG. 4 is a front elevation view of the paddle assembly of the sorting device.

FIG. 4a is a detail of the slideably mounted idler pulley.

FIG. 5a is an end elevation view of the upper wheel assembly and track of FIG. 4, taken along section line '5—5' of FIG. 4.

FIG. 5b is a detail of the carriage connector of FIG. 5.

FIG. 5c is a perspective view of the carriage connector of FIG. 5a illustrating the connector engaging the timing belt.

FIG. 6a is a side view of the paddle assembly of FIG. 4.

FIG. 6b is a side view of the paddle assembly of FIG. 6a, with part of the frame removed to show detail.

FIG. 7 is a perspective view of the lower carrying wheel cartridge of the carriage.

FIG. 8 is a block diagram of the control system used for operation of the sorting system under control of a programmable controller.

FIG. 9 shows an alternative embodiment of a sorting device embodying the present invention, constructed of multiple primary feed conveyors and multiple secondary feed conveyors.

DETAILED DESCRIPTION

Figure 1:
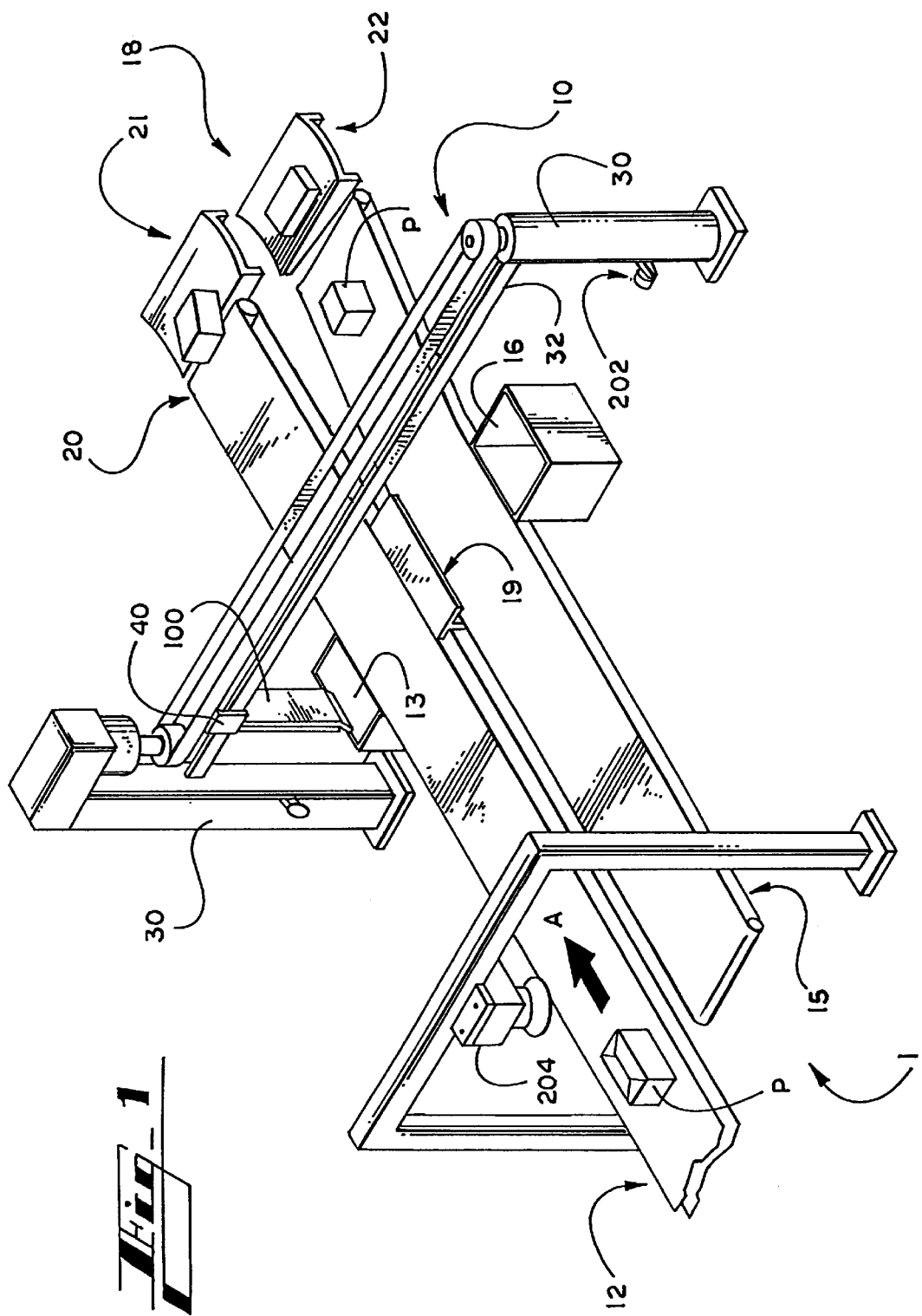
FIG. 1 is a perspective view of a sorting and feeding system embodying the present invention.

Referring now in more detail to the drawings, in which like numerals refer to like parts throughout the several views, FIG. 1 shows an overhead mounted sorting device 10 embodying the present invention. One or more sorting devices 10 may be incorporated in a sorting and feeding system 1 that may include, for example, at least one primary upper level feed conveyor 12, at least one secondary lower level feed conveyor 15, and at least one receiving destination, a multi-level tilt tray sorter 18. Immediately adjacent to the primary feed conveyor may be provided at least one secondary receiving destination, a chute 13, and immediately adjacent to the secondary feed conveyor may be provided at least one secondary receiving destination, a chute 16.

The primary feed conveyor 12 transfers objects to be sorted, such as parcels P, in the direction of arrows A causing them to pass under the sorting device 10. Prior to transfer, the parcels' destination location with regard to the tilt tray sorter 18 is relayed to the sorting device 10. In a manner described in detail below, the sorting device 10 diverts parcels P between conveyors 12, 15 by a laterally pushing motion. An astragal 19 is located between each pair of conveyors to provide a smooth transition surface for the parcels being diverted. The wide top of the astragal 19 is positioned slightly above the edge of each conveyor belt and bridges the gap between conveyors. It will be understood that one or all of the adjacent receivers 13, 16 may be conveyors, chutes, or fixed receptacles. Similarly, the preferred destination is a multi-level tilt tray sorter 18 but it will be understood that conveyors, chutes or fixed receptacles may be suitable receiving destinations. Also, the present invention can be used with many different types of feed conveyors, such as belt and powered roller variations.

In the embodiment shown in FIGS. 1–8, the receiving destination is a multi-level tilt tray sorter 18 such as disclosed in U.S. Pat. No. 5,570,773 ('773 patent), incorporated herein by reference. The following description includes components of the multi-level tilt tray sorter of '773 patent so that the arrangement and coordination between the present sorting and feeding system 1 and the multi-level tilt tray sorter 18 may be disclosed.

The multi-level tilt tray system of '773 includes a track and a train of carriages mounted for travel along the track. In the preferred form shown, the track forms a closed loop and the carriages travel through a transfer section 20 where they are loaded with parcels from the conveyors 12, 15 of the present invention. At output sections (not shown), the parcels P are removed from the carriages by tilting mechanisms that eject the parcels onto an output chutes corresponding to the parcel's destination, as described in the '773 patent.

The train of carriages is formed of a plurality of upper level trays 21 alternated with a plurality of lower level trays 22, as shown in FIGS. 1 and 3 of the present application. In the preferred embodiment of FIG. 1, the upper level trays 21 extend longitudinally over adjacent lower level trays 22. Also, the lower level trays 22 of every other carriage extend longitudinally over adjacent carriages, beneath the upper level trays 21. It should be understood that many advantages of the present invention may be incorporated in a sorting system which is not a closed loop. Also, the carriages might move in reversible directions, or the track could change elevation along its course or follow a serpentine path.

As described in '773 and understood by those skilled in the art, a tilt tray sorting system of the type described therein may be loaded with parcels that are metered in a controlled fashion to place parcels on particular tilt trays while the tilt tray sorting system is moving. Furthermore, the tilt tray sorting system controller must by able to direct a parcel to a destination output section and determine when to tilt the tray to eject the parcel. The preferred embodiment of the present invention as shown in FIG. 1 provides an advantageous feeding system for loading a multi-level tilt tray sorting system having these capabilities.

The transfer section 20 of the sorting and feeding system 1 includes a primary upper level feed conveyor 12 and a secondary lower level feed conveyor 15. The conveyors 12 and 15 are metering conveyor assemblies that are operable under the control of a programmable logic controller (PLC) 23, shown in FIG. 8. The PLC provided here to control the sorting and feeding system 1 may be the same PLC described in the referenced patent '773 to control the tray tilt sorter disclosed therein. The conveyors 12, 15 extend to a position closely adjacent to the outer side of the tilting trays 21, 22 so that parcels P can be delivered onto the trays. A carriage tracking station, described in the '773 patent, is located immediately downstream of the input section 20 and provides the input signals that permit the PLC to direct the loaded trays to the proper output stations.

Summarizing the coordination of movement between the feeding system 1 for a tilt tray sorter and the tilt tray sorter of '773, both may be operated under the control of the same PLC or a general purpose microprocessor such as found in a personal computer. Methods for programming such controllers to operate a sorting system of the type disclosed herein are conventional and known to those skilled in the art. The number of carriages and an identification code for each carriage are input into the PLC memory, along with the identification of the carriage that is initially aligned with each conveyor 12, 15 when movement of the carriage train begins. After the carriage train starts, it moves continuously along the track. Parcels P arrive in single file order on one of the conveyors 12, 15. In a manner described in detail below, the destination information associated with each parcel is entered into the PLC memory. As the carriage train moves around the track, the carriage tracking station provides a signal to the PLC, which is then able to determine at any given time the location of the carriages.

The destination information previously entered is stored in a sequential list. Next, the PLC calculates the number of encoder pulses that will occur between the location of the tracking station and the output section associated with the entered destination information. The PLC checks its memory to determine whether the status of the next tray 21, 22 approaching the transfer section 20 is "empty" or "full." If the next tray is not empty, the controller holds operation of the conveyors 12, 15 until it has an opportunity to check the next tilt tray. If the approaching tray is empty, a signal is sent to operate the input conveyor 12 or 15 to load the tray. The input conveyors 12, 15 are configured to operate rapidly and intermittently as described below on command from the controller, which starts operation of the conveyor shortly prior to the time at which the continuously moving empty tray 21 or 22 becomes aligned with the conveyor 12 or 15, respectively.

Upon commanding operation of the conveyor 12, 15, the controller also changes the status of the particular tray 21, 22 to "full" in memory and associates the next destination information in the sequential list with the particular tray. If desired, a photocell or other sensor can be placed between the conveyor and the carriages to determine whether in fact a parcel has been delivered to the tray upon operation of the input conveyor. As the now-loaded carriage continues to move, its passage is detected by the tracking station. The previously calculated number of pulses between the tracking station and the output section associated with the particular parcel are added to provide the count that will be reached when it is necessary to unload the parcel. This value is stored in association with the particular tray.

The PLC (23), upon receiving the unload count from the tracking station, sends a signal to operate the tilting mechanism associated with the output section assigned the destination information. Tilting begins shortly before complete alignment of the tray with the output chute, so that movement is imparted to the parcel P at the proper time for the parcel to slide off the tray onto the output section. Any number of trays can be tilted simultaneously depending on when they reach the location of the unload count. At this time, the memory record associated with the tray may be cleared of values associated with the sorted parcel and the tray status changed to "empty."

It is possible to operate the tilt tray sorting system with more than two conveyors 12, 15, each conveyor having a photocell detector associated with it to signal the location of a carriage whose tilt tray 21, 22 has just received a parcel from the conveyor. This permits the unload count for the carriage to be determined. It would be possible to alter the programmed logic to coordinate a row of conveyors with the moving tilt trays to allow all of the conveyors to continue loading their parcels without stopping. Of course, conveyors 12 and 15 can operate virtually simultaneously.

Turning now to the arrangement and configuration of the sorting device 10 embodying the present invention, FIG. 1 shows two vertical columns 30. Positioned on opposite sides of the secondary receiving destinations 13, 16, the columns are connected by a horizontal rail 32. The rail 32, extending across the conveyors 12, 15, provides overhead orientation and support for a carriage 40. As best shown in FIG. 5, the rail is diamond-shaped in cross-section, defining two upwardly orientated sides and two downwardly orientated sides. Extruded solid or hollow structural metal, or other suitably strong materials, may be utilized to construct the columns, rail, and accompanying bracing with connections made in a known manner. It is readily apparent that the cross-sectional shape of the rail may be altered to accommodate variable design criteria such as the rail span, weight and configuration of the carriage, or the placement of the columns, to list a few examples.

Referring now to FIGS. 4 and 5, the carriage 40 is mounted on the rail 32 in manner discussed in detail below. Located at one end of the rail, near the connection to either vertical column 30, a linear actuator is positioned and connected to drive the carriage 40 in a linear path along the rail. In the preferred embodiment, the linear actuator is a reversible servo-motor 42 mounted to a vertical column 30 so that the servo-motor drive shaft 43 is in a vertical position. Attached to the drive shaft 43 is a notched pulley 44 that is rotated clockwise or counter-clockwise by the servo-motor 42. A serrated timing belt 46 is supported by the notched pulley 44 at one end and by a slideably mounted smooth idler pulley 48 at the opposite end of the rail 32.

The smooth idler pulley 48 is attached to the top of a sliding block 51 which is connected to a timing belt tensioning geometric lock 57. The lock 57 may be secured to the rail 32 or vertical column 30. The idler pulley 48 mounted to a sliding block 51 and attached belt tensioning lock 57 provides a mechanism to adjust and hold belt tension. The belt tensioning lock 57 is an over-center locking mechanism that includes a pivotally attached arm. Throwing the arm of the belt tensioning lock over top dead center, toward the column 30, draws the sliding block 51 in the same direction. This drawing action pulls the belt 46 and increases tension. To secure the belt tensioning lock in the closed position, the outer end of the arm is thrown over top dead center and pressed down until it can not be pressed down any farther.

To connect the carriage 40 to the serrated timing belt 46, a clamping connector 49 is provided on the top of the carriage. As best shown in FIGS. 5a, 5b and 5c, the connector is constructed of two plates spaced apart to form a void that receives the timing belt 46. The first plate is a serrated back plate 50 configured to mate with the serrated side of the timing belt 46. The second plate is a smooth faced plate 53. To fasten the connector 49 to the timing belt 46, the two ends of the belt 46a and 46b are inserted between the two plates so that the smooth side of the belt ends faces the smooth plate 53 and the serrated side faces and engages the serrated plate 50. This arrangement is best illustrated in FIG. 5c. Inserting the belt ends 46a–b so that the teeth of the timing belt interlock with the grooves of the plate 50 fully connect the belt and carriage.

To remove the belt 46 from the connector 49, the belt tensioning lock 57 is released by throwing the arm from the closed position back over top dead center. Releasing the lock permits the sliding block 51 to spring back slightly toward the carriage 40, thereby loosing the belt. With the belt loosened, the belt ends 46a–b may be lifted from the connector 49. Providing this quick-release connection between carriage 40 and timing belt 46, these two components can be quickly separated without the need for tools should the carriage require replacement.

When rotated in either a clockwise or counter-clockwise direction by the servo-motor 42, the serrated timing belt 46 pulls the carriage 40 in a linear path between the extreme limits of the rail 32.

The Carriage

FIGS. 5a, 6a, 6b and 7, show the preferred embodiment of the carriage 40 in greater detail. The carriage 40 has a frame 52 in the shape of an elongate "C", with the open side of the "C" receiving the rail 32. The carriage 40 includes bearing assemblies for contacting the rail 32 in the form of an upper carrying wheel cartridge 54 and a lower carrying wheel cartridge 56 within the frame 52, above and below the rail 32, respectively. As shown in FIG. 5, the wheel cartridges 54, 56 include feet 58, 60 extending outward from right angles 62, 64, respectively, which point toward the monorail. The feet 58 on the upper carrying wheel cartridge 54 are fixed to the upper surface of the frame 52 by welding, bolts, or other suitable attachments. The lower carrying wheel cartridge 56 includes the height adjustment feature disclosed in U.S. Pat. No. 5,489,017 ('017 patent), incorporated herein by reference.

A plurality of wheels 68 are mounted for rotation on adjacent sides of the right angles 62, 64. The wheels 68 are preferably urethane. As can best be seen in FIG. 6b, these wheels 68 are arranged to engage the flat surfaces of the diamond-shaped rail 32. As will be described in detail below, the ability to adjust the height of the lower carrying wheel cartridge 56 provides an automatic gap adjustment feature such that the wheels 68 engage the rail 32 with pressure. The gap adjustment feature biases the wheels 68 against the monorail 32, and allows the carriage 40 to be used on a variety of different sized and shaped rails. The main advantage of the automatic adjustment feature is that urethane rollers used in the past wear over time and create clearance between the rail and the wheels. This clearance can cause a corresponding rattling, noise or vibration. By providing the adjustment feature, the wheels 68 remain against the rail despite changes in the diameter of the wheels.

As best shown in FIG. 7, details of the lower carrying wheel cartridge 56 and the unique automatic gap adjustment feature of the '017 patent are illustrated. The lower carrying wheel cartridge 56 is suspended on two cylinders 70, 72. The cylinders 70, 72 preferably extend transversely under the back and front ends of the lower carrying wheel cartridge 56, so that the cartridge may remain stable.

Pins 74, 76 extend eccentrically out of both ends of the cylinders 70, 72, respectively, and are fixed to the cylinders such that rotation of the pins causes a corresponding rotation of the cylinders. The pins 74, 76 are mounted for free rotation within holes on opposite sides of the frame 52.

As shown in FIG. 6b, lever arms 80, 82 are fixed to the pins 74, 76 at ends which extend out of the side of the frame 52 opposite the open side that receives the rail 32. A compression spring 84 extends between the two lever arms 80, 82 and biases the two arms away from one another. In the embodiment shown, the spring 84 may be any mechanical or electromechanical device that can offer a compression force, including but not limited to hydraulic cylinders, electrostatic cylinders, magnetic devices, and steel recoil springs.

Returning again to FIG. 7, the cylinders 70, 72 serve as cams and present camming surfaces on their outer diameters for engaging the feet 60 on the lower carrying wheel cartridge 56. The eccentric mounting of the pins 74, 76 relative to the cylinders 70, 72 causes the distance between the camming surface for each of the cylinders and the corresponding pin to increase or decrease, depending upon which portion of the surface is presented to the feet 60. Thus, as the point of contact between the camming surface for each of the cylinders 70, 72 approaches the point A on the outer diameter of the cylinders, the feet 60, and therefore the wheel cartridge 56, moves upward, or away from the respective pin 74, 76. Correspondingly, as the point of contact on the surface of each of the cylinders 70, 72 approaches the point B on the outer diameter of the cylinders, the lower carrying wheel cartridge 56 moves downward, or closer to the pins 74, 76. It can be appreciated that rotating the pins 74, 76 varies the height of the lower carrying wheel cartridge 56, or either end of the cartridge so that the cartridge may snugly engage the rail 32 regardless of small changes in the dimensions of the wheels 68.

Preferably, the camming surfaces of the two cylinders 70, 72 are set such that for a normal or average size of the rail 32, the camming surfaces of the cylinders engage the feet 60 at some point between A and B on the camming surfaces, so that adjustments both up and down in the height of the lower carrying wheel cartridge 56 are within the range of movement of the spring 84. As can be seen in the example of FIG. 7, the normal point of contact for the cylinder 70 is the point C and the normal point of contact for the cylinder 72 is the point D. As such, counterclockwise rotation of the pin 74 (and the lever arm 80) and clockwise rotation of the pin 76 (and the lever arm 82) causes the lower carrying wheel cartridge 56 to rise, until the point of contact for each of the cylinders reaches a location between point C and point A at which the wheels 68 firmly contact the rail 32 and preclude further rising. Contact with the point A represents the maximum "camming action" for the cylinders 70, 72. Likewise, clockwise rotation of the pin 74 (and the lever arm 80) and counterclockwise rotation of the pin 76 (and the lever arm 82) causes the lower carrying wheel cartridge 56 to lower under pressure from an enlargement of the rail. Contact with the point B represents the minimum "camming action" for the cylinder. Preferably, the variance in size of the rail 32 will not exceed the distance determined by the camming surfaces of the cylinders 70, 72 reaching the points A and B. It can be appreciated that the carriage 40 with the adjustment feature may fit without modification any rail having right-angle contact surfaces along the top and bottom sides.

From the foregoing discussion, it can be understood that the compression spring 84, by forcing the two lever arms 80, 82 apart, biases the point of contact of the camming surfaces on the cylinders 70, 72 with the feet 60 toward the point A on each of the cylinders. Thus, the compression spring 84 biases the lower carrying wheel cartridge 56 toward the upper carrying wheel cartridge 54, having the effect of closing any gaps that exist between the rail 32 and the wheels 68, and biasing the lower wheels 68 against the bottom of the rail, allowing for smooth and constant contact of the wheels 68 with the rail. It is also to be understood that because each of the pins 74, 76 is free to rotate independently, each end of the lower carrying wheel cartridge 56 adapts independently to fit against the rail.

For best results, a relatively constant force spring is used between the two lever arms 80, 82. It is to be understood that the camming surfaces on the two cylinders 70, 72 can be reversed and a tension spring may be used. In addition, the automatic gap adjustment feature of the present embodiment can be incorporated into a suspended rail system so that the gap adjustment is along the top of the rail. Furthermore, the gap adjustment feature could be added to each side of the rail.

The Paddle

FIGS. 4 and 5 show a sub-assembly of the sorting device 10 attached to the carriage 40. A paddle 100 extends from the carriage to a position near the conveyors 12, 15, or preferably contacts whichever conveyor is located directly below the carriage. When moved with the carriage, the paddle provides the mechanism to direct a parcel P between conveyors 12, 15 or the conveyors and adjacent receivers 13, 16.

The paddle 100 is an assembly constructed of a first plate 102 and a second plate 104 spaced apart to define a void 106. Each plate includes an outward face and an inward side. The plates are mated so that the inward sides are orientated toward each other and the outward faces form the opposite sides of the paddle. The outward face of each plate 102, 104 is sheathed with an impact resilient material 107, preferably an elastomer. The plates 102, 104 of the paddle are attached to the carriage 40 at a first end 108 and extend downward toward the conveyors 12, 15 at a second end 110. Each plate may include a cut-out section which receives the exposed components of the height adjustment feature such that the plates do not interface with either the spring 84 or lever arms 80, 82. The void 106 continues between the plates 102, 104 toward the second end 110 where that section of the void further defines a recess 112. The recess 112 receives a retractably mounted floating wiper 114. The wiper defines a first edge 115*a* positioned within the recess 112 and a second edge 115*b*, protruding beyond the recess. The wiper 114 is biased to contact the surface of the conveyors. The first edge 115*a* is attached to a biasing mechanism 116 positioned within the void 106 that operates to bias the wiper's second edge 115*b* against the conveyors.

In the preferred embodiment, the plates 102, 104 are aluminum, but may be another equally strong and light material; the impact resilient material 107 is rubber, but may be any suitable elastomeric compound; the biasing mechanism 116 is one or more springs, but may be any mechanical or electromechanical device that can offer a compression force; and the floating wiper 114 is constructed of rubber or plastic but may be any suitable material. Suitable examples are nylon, polyethylene or polyproplene.

Referring to FIGS. 1 and 2 to summarize the carriage-paddle assembly movement of the sorting and feeding system 1, the paddle 100 is driven by the carriage 40 from a first ready position R1, immediately adjacent the outside edge of the primary feed conveyor 12, across the path of either conveyor 12, 15 to contact a parcel P being transported, push the parcel between conveyors or to a secondary receiving destination 16, and return to the first ready position R1. The path of the paddle, as it is driven along the rail 32, is best represented in FIG. 2 by the dotted lines on either side of the rail. More specifically, a parcel traveling longitudinally along a conveyor 12, 15 is detected, in a manner more fully described below, and that parcel is either permitted to continue uninterrupted or is diverted. If the conveyor transporting the parcel is the one associated with the parcel's receiving destination 21 or 22, the paddle 100 remains at the first ready position R1 while that parcel passes through the sorting device 10 uninterrupted. On the other hand, if the conveyor transporting the parcel does not lead to the parcel's receiving destination on the tilt tray sorter 18, the paddle is activated and driven as follows.

If the parcel P must be diverted from the primary feed conveyor 12 to the secondary feed conveyor 15 or any other conveyor positioned under the rail 32, the paddle 100 is activated and driven by the carriage 40 at a time calculated to intersect the parcel as it passes directly beneath the rail 32. Once contacting the parcel, the carriage continues to drive the paddle a distance sufficient to push the article from one conveyor 12 to the next 15. If the article must be diverted from the secondary conveyor 15 to the primary conveyor 12, the paddle is activated and driven by the carriage from a first ready position R1 to the opposite end of the rail where it stops at a second ready position R2. This staging step is completed before the parcel passes directly beneath the rail 32. The paddle remains at the second ready position R2 until a time calculated to return the paddle so that it intersects the parcel as the parcel passes directly beneath the rail 32. At that time, the paddle is then driven a distant sufficient to push the parcel from the secondary feed conveyor 15 to the primary feed conveyor 12.

The sorting device 10 may also be directed to entirely remove a parcel P from the conveyors 12, 15 because the tilt tray sorter 18 is not associated with that parcel's destination location. This may occur, for example, if the parcel is on the current conveyor in error and does not in fact belong on any of the available conveyors. Like the sequence described immediately above, the paddle 100 is driven from a first ready position R1 to intersect the parcel as it passes directly beneath the rail 32. After contact with the parcel, the paddle is driven further to push the parcel off all the conveyors and into an adjacent receiver 13, 16.

Referring now to FIG. 3, a beam photocell transmitter 202 is positioned upstream of the entrance to the sorting device 10, to provide a signal indicating a parcel P is entering the sorting device. The photocell 202 is a retro-reflective photocell that provides a signal when a parcel passing immediately in front of it breaks the beam. Similarly, an over-the-belt optical reader 204 is positioned upstream of the sorting device 10 to capture all destination indicia affixed to the parcel P before the parcel reaches the photocell 202. A suitable optical reader system for imaging labels is shown in U.S. Pat. Nos. 5,291,564; 5,308,960; 5,327,171; and 5,430,282 which are incorporated herein by reference. Systems for locating and decoding bar codes and the MaxiCode® dense code symbology are described in U.S. Pat. Nos. 4,874,936; 4,896,029; 5,438,188; 5,412,196; 5,412,197; 5,343,028; 5,352,878; 5,404,003; 5,384,451, 5,515,447, European Patent 0764307, and PCT Publication No. WO 95/34043. Other systems known in the art may be appropriate.

Referring to the block diagram of FIG. 8, the operation of the sorting device 10 is automated by the programmable logic controller (PLC) 23. The PLC may receive input signals from the optical reader 204 that reads alpha-numeric characters, barcode or two-dimensional symbols (such as MaxiCode® symbols) on the parcels. Such a symbol may contain address information that allows the PLC to determine, in a well known manner, which is the correct conveyor 12, 15 to transport the parcel to the appropriate tray 21, 22 of the tilt tray sorter 18. The PLC may also receive information about the parcel P directly from other sensors 208 (not shown), such as a scale or a device for measuring the parcel's dimensions. A set of rotary belt encoders 210 are positioned to measure the displacement of each conveyor 12, 15 and the output of these encoders 210 is input to the PLC. Parcel information may also be manually entered at a keyboard 212 (not shown). The PLC, in response to these input signals, sends control signals to the servo-motor 42 which drives the carriage in response.

Operation

In operation of the sorting and feeding system 1 for a tilt-tray sorter 18 that incorporates a sorting device 10 of the present invention, parcels P are placed on the primary conveyor 12. The parcels may arrive from an upstream automatic handling system or be placed manually in single file on the conveyor. The PLC 23 receives input signals from the rotary belt encoders 210 associated with the conveyor 12, and from the optical reader 204 or an alternative label reader or manual input device. The optical reader or other input device is used to acquire destination data about each parcel as the parcel approaches the sorting device 10. Any bar codes or other symbols on a parcel are detected and decoded. Destination information may be embedded in a dense code, or may be stored in a database location the address of which is contained in a bar code. Furthermore, textual address information on the parcel label can be analyzed using OCR techniques.

When a parcel is imaged at the reader 204, the current count of the encoder 210 is obtained. The rotary encoder device 210 allows the PLC 23 to determine how far the feed conveyor 12 has traveled since any particular parcel was identified by the reader. This data, together with the known distance from the reader 204 to the path of the paddle 100, is processed and used to determine when the carriage 40 should be driven so as to direct the paddle 100 against the parcel P and push it from one conveyor to the other, as described above.

A record for each parcel stored in the PLC memory may contain the parcel identification, destination address, and characteristics such as dimensions and weight, a description of the contents, or a code indicating the contents are fragile or hazardous or have some other special status. Once the destination information for the parcel is known, the PLC looks in an appropriate part of its memory for the proper level tray 21, 22 corresponding to the parcel's destination. Preferably, this information is stored in fields of a record already created for the parcel.

In a known manner, the PLC 23 determines when a parcel P is approaching the sorting device 10 and to which level tray 21, 22 the parcel should be transferred. The PLC reads the encoder counts and photocell 202 signals as the parcel travels, and compares this position information to the discharge location information stored in memory. When the PLC receives signals indicating that the parcel is about to enter the path of the paddle 100, that is, pass directly under the rail 32, the PLC sends control signals to the servo-motor 42 instructing the servo-motor to drive the carriage 40 along the monorail, in the direction required, and push the parcel from the current conveyor to the conveyor associated with the appropriate tilt tray 21, 22. It will be understood that should the PLC confirm that the current conveyor is the conveyor associated with the appropriate receiving destination, the PLC will not signal the servo-motor and the parcel will continue being transported by the current conveyor, through the sorting device 10 and uninterrupted by the paddle 100.

Alternative Embodiment

By way of example and not limitation, FIG. 9 illustrates a feeding system 2 incorporating three sorting devices 250a–c similar to the sorting device 10 disclosed above. In accordance with this alternative embodiment, a system 2 for automatically sorting and feeding objects, such as parcels, to output destinations for further processing may be constructed, including: two primary feed conveyors 252a and 252b transporting parcels, positioned adjacent to each other; two secondary feed conveyors 254a and 254b, one positioned adjacent the outer side of each primary conveyor to form four adjacent conveyors; three rails 256a–c, orientated above and across the four conveyors; three carriages 258a–c, mounted to translate along each respective rail; three paddles 260a–c, attached to and extending from each respective carriage down into the path of parcels traveling on the conveyors; and, a controller PLC (not shown) capable of operating the system.

In this alternative embodiment, the primary feed conveyors 252a, 252b and secondary feed conveyors 254a, 254b are configured so that their respective output ends will deposit objects onto an equal number of destination locations 262a–d. Each secondary feed conveyor 254a, 254b includes three secondary destination locations 264a–f, located immediately adjacent the outer side of each secondary conveyor and directly under the rails 256a–c. It will be understood that the destination locations 262 and 264 may be powered conveyors, chutes, receptacles or a multi-level tilt tray sorter as described above, to list a few examples.

Each rail 256a–c, positioned above and orientated across all four conveyors and secondary destination locations 264a–f, are supported at opposite ends by upright columns as described in the above section disclosing the first embodiment. Each carriage 258a–c, mounts the respective rail and is driven back and forth by a reversible servo-motor and drive belt configuration as described in the above section disclosing the preferred embodiment. The paddles 260a–c, affixed to the respective carriage and extended downward to contact the conveyors, are driven when required to divert the objects on the conveyors. The path of the paddles 260a–c are best represented by the dashed lines on either side of each rail 256a–c. Horizontal translation of a carriage provides the range of motion to align a paddle with a parcel and divert it between the conveyors 252a, 252b, 254a and 254b, or entirely off the conveyors and into secondary destination locations 264a–f.

In practice, parcels may be fed to each primary feed conveyor 252a, 252b by a conveyor control system 268 such as described in U.S. Pat. No. 5,711,410 ('410 patent), incorporated herein by reference. By providing such a conveyor control system 268 immediately upstream of the primary conveyors, parcels P are delivered to the primary conveyors in a metered and spaced manner. The speed of the control system, quantity of parcels, and space between the parcels can all be adjusted to accommodate the size and configuration of the sorting system 2. Such a feed conveyor control system may also be used to position parcels to await final loading into a passing transport unit, such as a tilt tray of the tilt tray sorter as described in connection with the first embodiment.

Each carriage is directed according to destination information affixed to each parcel and input to a PLC by an optical reader 266. A shaft encoder (not shown) on each primary feed conveyor 252a, 252b can track the object while photocells (not shown) immediately before each sorting device 250a–c signal that the parcel is entering the path of the paddle. For example, a parcel on one of the primary conveyors, whose final destination is associated with the destination location positioned at the end of that conveyor, will pass uninterrupted under the rails 256a–c. However, an object on one of the primary conveyors whose final destination is not associated with the staging location positioned at the end of that conveyor will be diverted from that conveyor by a paddle driven by a carriage. That object will be pushed to the other primary conveyor, or to a secondary conveyor, or to a secondary destination location.

To summarize the carriage-paddle assembly movement, a parcel traveling longitudinally along a primary feed conveyor 252a, 252b is detected in a manner fully described below. If the primary conveyor transporting the parcel is the one associated with the parcel's destination location 262b–c, the paddles 260a–c remain at their respective ready positions S1, S2 and S3, located immediately between the primary feed conveyors, while that parcel passes through the sorting devices 250a–c uninterrupted. On the other hand, if the conveyor transporting the parcel does not lead to the parcel's destination location, one of the paddles is activated. The paddles 260a–c may be driven by the respective carriages 258a–c, from the respective ready positions S1–3, to divert a parcel from a primary to adjacent primary conveyor; from a primary to a secondary conveyor; or from a primary to a secondary receiving destination. Each of these three sequences can be adequately described by presenting the example of only the first sorting device 250a. It will be understood that the other sorting devices 250b–c may be programmed to perform the same sequence as described with reference to the first sorting device 250a.

If a parcel must be diverted from primary feed conveyor 252a to adjacent primary feed conveyor 252b, the paddle 260a can be driven from the first ready position S1 to a second ready position T1, located between primary feed conveyor 252a and secondary feed conveyor 254a, before the parcel reaches the sorting device 250a. Sequentially, the paddle 260a must be pre-staged; that is, positioned to the right of the parcel before that parcel enters the sorting device 250a (as viewed from the optical reader 266). Once the parcel begins to pass directly under the rail 256a, the paddle 260a is activated and driven by the carriage 258a at a time calculated to intersect the parcel as it passes directly beneath the rail 256a. Once contacting the parcel, the carriage 258a continues to drive the paddle 260a a distance sufficient to push the parcel from primary feed conveyor 252a onto 252b. Like the astragal 19 described in the preferred embodiment, an astragal (not shown) may be positioned directly below the rail and between each two conveyors to facilitate the parcel's smooth transfer between conveyors.

Similarly, if a parcel must be diverted from primary feed conveyor 252b to adjacent primary feed conveyor 252a, the paddle 258a can be driven from the first ready position S1 to a third ready position U1, located between primary feed conveyor 252b and secondary feed conveyor 254b, before the parcel reaches the sorting device 250a. Sequentially, the paddle 260a must again be pre-staged; that is, positioned to the left of the parcel before that parcel enters the sorting device 250a. Once the parcel begins to pass directly under the rail 256a, the paddle 260a is activated and driven by the carriage 258a at a time calculated to intersect the parcel as it passes directly beneath the rail 256a. Once contacting the parcel, the carriage 258a continues to drive the paddle 260a a distance sufficient to push the parcel from primary feed conveyor 252b onto 252a.

If a parcel must be diverted from primary feed conveyor 252a to adjacent secondary feed conveyor 254a, the paddle 260a can be driven from the first ready position S1 toward the right. Once the parcel begins to pass directly under the rail 256a, the paddle 260a is driven at a time calculated to intersect the parcel as it passes directly beneath the rail 256a. Once contacting the parcel, the carriage 258a continues to drive the paddle 260a a distance sufficient to push the parcel from primary feed conveyor 252a onto secondary feed conveyor 254b. Similarly, if a parcel must be diverted from primary feed conveyor 252b to adjacent secondary feed conveyor 254b, the paddle 260a can be driven from the first ready position S1 toward the left. Once the parcel begins to pass directly under the rail 256a, the paddle 260a is driven at a time calculated to intersect the parcel as it passes directly beneath the rail 256a. Once contacting the parcel, the carriage 258a continues to drive the paddle 260a a distance sufficient to push the parcel from primary feed conveyor 252b onto secondary feed conveyor 254b.

If a parcel must be diverted from primary feed conveyor 252b to a secondary destination location 264d, the paddle 260a can be driven from the first ready position S1 toward the left. Once the parcel begins to pass directly under the rail 256a, the paddle 260a is driven at a time calculated to intersect the parcel as it passes directly beneath the rail 256a. Once contacting the parcel, the carriage 258a continues to drive the paddle 260a from the primary feed conveyor 252b, over the secondary feed conveyor 254b, and an additional distance sufficient to push the parcel from secondary feed conveyor 254b into secondary destination location 264d. Similarly, if a parcel must be diverted from primary feed conveyor 252a to a secondary destination location 264a, the paddle 260a can be driven from the first ready position S1 toward the right. Once the parcel begins to pass directly under the rail 256a, the paddle 260a is driven at a time calculated to intersect the parcel as it passes directly beneath the rail 256a. Once contacting the parcel, the carriage 258a continues to drive the paddle 260a from the primary feed conveyor 252a, over the adjacent secondary feed conveyor 254a, and an additional distance sufficient to push the parcel from secondary feed conveyor 254a into secondary destination location 264a.

The above alternative embodiment may be compounded to create a sorting and feeding system constructed of many devices embodying the present invention and many feed conveyors that sort and feed a far greater number of destination locations. Thus, the sorting device embodying the present invention 10 can be duplicated as many times as desired for sorting to more destination locations. In addition to the many possible combinations and configurations of primary and secondary feed conveyors, other alternative embodiments may include other methods of conveyance; any number of different linear actuators for driving the carriage; and, any number or configuration of destination locations.

Operation of Alternative Embodiment

In operation of a sorting and feeding system 2 that incorporates many sorting devices 250a–c, parcels P are placed on the primary feed conveyors 252a, 252b. The parcels may arrive from upstream conveyor control system 268 as disclosed in U.S. Pat. No. 5,711,410 ('410 patent) and incorporated herein by reference, or be placed manually in single file on the conveyor. The PLC 23 receives input signals from the rotary belt encoders (not shown) associated with each primary feed conveyor 252a–b, and from the optical readers 266 or an alternative label reader or manual input device. The optical reader or other input device is used to acquire destination information about each parcel as the parcel is received onto the primary feed conveyors from the conveyor control systems 268. Any bar codes or other symbols on a parcel are detected and decoded. Destination information may be embedded in a dense code, or may be stored in a database location the address of which is contained in a bar code. Furthermore, textual address information on the parcel label can be analyzed using OCR techniques.

When a parcel is imaged at the reader 266, the current count of the encoder is obtained. The rotary encoder device allows the PLC 23 to determine how far the feed conveyor 252a,b has traveled since any particular parcel was identified by the reader. This data, together with the known distance from the reader 266 to the path of each paddle 260a–c, is processed and used to determine when the carriage 258a–c should be driven so as to direct the respective paddle 260a–c against the parcel P and push it from one conveyor to the other.

A record for each parcel stored in the PLC memory may contain the parcel identification, destination address, and characteristics such as dimensions and weight, a description of the contents, or a code indicating the contents are fragile or hazardous or have some other special status. In the event the destination locations 262a–d are the trays of a multilevel tilt tray sorting system, the PLC looks in an appropriate part of its memory for the proper level tray corresponding to the parcel's destination. Preferably, this information is stored in fields of a record already created for the parcel.

In a known manner, the PLC 23 determines when a parcel P is approaching the sorting device 250a–c and to which destination location the parcel should be transferred. The PLC reads the encoder counts and photocell signals as the parcel travels, and compares this position information to the discharge location information stored in memory. The belts of the conveyors 252a–b, 254a–b are preferably in continuous motion. When the PLC receives signals indicating that the parcel is about to enter the path of the first paddle 260a, that is, pass directly under the rail 256a, the PLC sends a check signal that the paddle is in ready position S1. Upon receiving back a confining signal that the paddle 260a is ready to divert the parcel, the PLC sends a control signals to the servo-motor 272a instructing the servo-motor to drive the carriage 258a along the rail 256a, in the direction required, and push the parcel from the current conveyor to the conveyor or secondary destination location 264a–d associated with the destination information.

Where the PLC receives signals indicating that a parcel is about to enter the path of the first paddle 260a, and the PLC sends a check signal but receives a reply that the paddle 260a is not in ready position S1, that parcel will continue traveling, until the PLC receives a signal indicating that the same parcel is about to enter the path of the second paddle 260b. At that time, the PLC sends a check signal that the paddle is in ready position S2. Upon receiving back a confirming signal that the paddle 260b is ready to divert the parcel, the PLC sends control signals to the servo-motor 272b instructing the servo-motor to drive the carriage 258b along the rail 256b, in the direction required, and push the parcel from the current conveyor to the conveyor or secondary destination location 264b–e associated with the destination information. In the event that paddle 260b is unavailable, the PLC will perform the above described sequence with regard to paddle 260c. Should paddle 260c not be in a ready position S3, the PLC will send control signals as required to stop the conveyor carrying the parcel to be diverted, and interrupt any diverting sequences in process by the other sorting devices 250a–b, until paddle 260c is in ready position S3. It is the purpose of this last step, the stop and interrupt sequence, to prohibit any parcel from exiting the feeding and sorting system 2 on a conveyor not associated with the parcel's destination location.

It will be understood that the stop and interrupt sequence may be programmed for each entry device 250a–c and not just the last. Thus, in the first sorting example, when the PLC received a signal revealing the first paddle 260a was not in ready position S1, the conveyor may be stopped at that time. This may be required if, for example, the parcel must be diverted by paddle 260a to secondary destination location 264a. It will be understood by those skilled in the art, that parcels may also be metered in groups of three so that all three sorting devices 250a–c receive, sort and return to their respective ready positions simultaneously. It will also be understood by those skilled in the art, that the PLC that controls the sorting and feeding system 2 may be the same PLC that controls the automatic handling system 268 described in the '410 patent.

Those skilled in the art will understand that the programs, processes, methods, etc. described herein are not related or limited to any particular computer or apparatus. Rather, various types of general purpose machines may be used with programs constructed in accordance with the teaching described herein. Similarly, it may prove advantageous to construct specialized apparatus to perform the method steps described herein by way of dedicated computer systems with hard-wired logic or programs stored in nonvolatile memory, such as read only memory.

While the present invention in its various aspects has been described in detail with regard to preferred embodiments thereof, and an example of an alternative embodiment has been provided, it should be understood that variations, modifications and enhancements can be made to the disclosed apparatus and procedures without departing from the scope of the present invention as defined in the appended claims.

What is claimed is:

1. A sorting device mounted above objects traveling longitudinally along a conveyor, comprising:
   a rail orientated across the conveyor;
   a carriage mounted to translate along the rail;
   a paddle extending from the carriage down into a path of objects traveling on the conveyor; the paddle including:
      a first plate and a second plate spaced apart to define a void, each plate including an outward side and an inward side;
      a floating wiper positioned partially within the void and resiliently urged into contact with the conveyor; and
      means positioned within the void for urging the floating wiper into contact with the conveyor; and
   a controller positioned to translate the carriage along the rail.

2. The sorting device of claim 1, wherein the rail is located above the objects and is diamond-shaped in cross-section, defining two upwardly orientated sides and two downwardly orientated sides.

3. The sorting device of claim 1, wherein the conveyor is a transporting device that directs objects toward a sorting system.

4. The sorting device of claim 1, wherein the carriage is a channel shaped frame mounted to substantially enclose the rail, and further comprises:
   an upper bearing assembly positioned between the frame and top of rail, including a plurality of rollers that engage the upwardly orientated sides of the rail;
   a lower bearing assembly positioned between the frame and bottom of rail, including a plurality of rollers that engage the downwardly orientated sides of the rail; and
   a gap adjustment assembly positioned between the frame and the lower bearing assembly.

5. The sorting device of claim 4, wherein the carriage is driven along the rail by a linear actuator connected to a controller.

6. The sorting device of claim 5, wherein the controller is responsive to an optical reader which provides the destination information associated with each object, and directs the linear actuator responsive to that information.

7. The sorting device of claim 6, wherein the optical reader is positioned to read destination indicia affixed to the object.

8. The sorting device of claim 1, wherein each plate is defined by an upper end affixed to the carriage frame and a lower end sufficiently close to the conveyor to permit either plate to contact the objects traveling along the conveyor; and
   the floating wiper extends beyond the lower end of each plate to contact the surface of the conveyor.

9. The sorting device of claim 8, wherein each plate includes an impact resilient material affixed to the outward side.

10. A paddle, for use with a sorting device mounted above objects traveling longitudinally along a conveyor, the sorting device including a carriage traveling on a rail orientated across the conveyor, the paddle comprising:
    an assembly attached to the carriage at a first end and extending downward toward the conveyor to a second end;
    the second end includes a recess for receiving a retractably mounted wiper; and
    the wiper defining a first edge within the recess attached to a biasing mechanism, and a second edge that protrudes from the recess toward the conveyor;
    the wiper being resiliently urged into contact with the conveyor by the biasing mechanism.

11. The paddle of claim 10, wherein the recess is defined by a first plate and a second plate spaced apart to define a void, each plate including an outward side and an inward side.

12. The paddle of claim 11, wherein each plate defines an upper end affixed to the carriage frame and a lower end that extends from the carriage down into a path of objects traveling on the conveyor; and
    each plate includes an impact resilient material affixed to the outward side.

13. A method for sorting objects traveling longitudinally along a conveyor, with a sorting device mounted above the objects, including a rail orientated across the conveyor, a carriage mounted on the rail for translating along the rail, and a paddle affixed to the carriage and extending downward to contact the objects below, comprising:
    transporting an object along a primary conveyor, the object bearing destination indicia;
    reading the destination indicia;
    decoding the destination indicia and storing the destination information in a programmable controller;
    responsive to the destination information, the controller directing a linear actuator to drive the carriage along the rail to cause the paddle to divert an object from the primary conveyor to an adjacent secondary conveyor; and
    responsive to the programmable controller, causing the paddle to divert an object from the secondary conveyor to the adjacent primary conveyor.

14. The method of claim 13 wherein the step of reading the destination indicia comprises scanning the object and relaying a signal representative of the destination location to a decoding device.

15. The method of claim 13, wherein the step of decoding the destination indicia includes comparing the signal representative of the indicia to a database of known characters.

16. The method of claim 13, further comprising, responsive to the programmable controller, causing the paddle to divert an object from the primary conveyor to an adjacent first destination location.

17. A method for sorting objects traveling longitudinally along a conveyor, with a sorting device mounted above the objects, including a rail orientated across the conveyor, a carriage mounted on the rail for translating along the rail, and a paddle affixed to the carriage and extending downward to contact the objects below, comprising:
    transporting an object along a primary conveyor, the object bearing destination indicia;

reading the destination indicia;

decoding the destination indicia and storing the destination information in a programmable controller;

responsive to the destination information, the controller directing a linear actuator to drive the carriage along the rail to cause the paddle to divert an object from the primary conveyor to an adjacent secondary conveyor; and responsive to the programmable controller, causing the paddle to divert an object from the secondary conveyor to an adjacent second destination location.

18. The method of claim 17, further comprising diverting an object from the primary conveyor to the secondary conveyor using a second sorting device including a second rail orientated across the primary and secondary conveyors, a second carriage mounted on the second rail, and a second paddle affixed to the carriage; and diverting an object from the secondary conveyor to the primary conveyor using the second sorting device.

19. The method of claim 17, further comprising diverting an object from the secondary conveyor to the second destination location using a second sorting device including a second rail orientated across the primary and secondary conveyors, a second carriage mounted on the second rail, and a second paddle affixed to the carriage.

20. A sorting device mounted above objects traveling longitudinally along a conveyor, comprising:

a rail orientated across the conveyor;

a carriage mounted to translate along the rail;

a paddle extending from the carriage down into a path of objects traveling on the conveyor; and a linear actuator positioned to translate the carriage along the rail, said linear actuator comprising:

a serrated belt attached to the carriage;

a notched drive pulley engaging the belt, the belt forming a loop around the notched pulley and an idler pulley; and a belt connector comprising a first serrated plate spaced apart from a second plate to form a void receiving two ends of the belt held in the belt connector by engagement of serrations of the timing belt ends with serrations of the first plate.

21. The sorting device of claim 20, further comprising means for tensioning the belt loop and for selectively releasing tension in the belt loop so as to allow removal of the belt ends from the void.

22. A sorting system, comprising:

a primary conveyor and a secondary conveyor parallel to the primary conveyor;

a plurality of sorting devices mounted in sequence above objects traveling longitudinally along the conveyors, each of the sorting devices comprising:

a rail orientated across the primary and secondary conveyors;

a carriage mounted to translate along the rail; and a paddle extending from the carriage down into a path of objects traveling on the conveyors; and a controller positioned to translate the carriages along their respective rails, the controller operating any of the sorting devices at selected times to divert an object from the primary conveyor to the secondary conveyor and to divert an object from the secondary conveyor to the primary conveyor.

* * * * *